United States Patent [19]

Hamilton

[11] Patent Number: 5,443,341

[45] Date of Patent: Aug. 22, 1995

[54] REMOVABLE TRUCK TIE-DOWN DEVICE

[76] Inventor: Jeffery L. Hamilton, 16818 S. 203rd East Ave., Broken Arrow, Okla. 74014

[21] Appl. No.: 249,802

[22] Filed: May 26, 1994

[51] Int. Cl.⁶ ............................................. B61D 45/00
[52] U.S. Cl. ................................ 410/116; 24/68 CD; 410/110; 410/106
[58] Field of Search ............... 410/101, 104, 106, 108, 410/109, 110, 116; 296/40, 41, 43; 248/499; 105/390; 24/68 CD, 115 M, 536, 568, 526, 524, 522

[56] References Cited

U.S. PATENT DOCUMENTS

| | | | |
|---|---|---|---|
| 1,485,906 | 3/1924 | Bonham et al. | 24/526 X |
| 1,516,489 | 11/1924 | Barton . | |
| 2,608,167 | 8/1952 | Harris | 410/116 |
| 2,655,874 | 10/1953 | Swann | 410/106 |
| 2,675,265 | 4/1954 | Meighan et al. | 410/116 |
| 2,866,248 | 12/1958 | Reno | 24/248 |
| 3,351,356 | 11/1967 | Clark et al. | 280/179 |
| 3,421,726 | 1/1969 | Getter | 248/361 |
| 4,191,108 | 3/1980 | Jones | 410/110 |
| 4,607,991 | 8/1986 | Porter | 410/110 |
| 4,812,093 | 3/1989 | Millar, Jr. | 410/110 |
| 4,850,770 | 7/1989 | Millar, Jr. | 410/110 |

Primary Examiner—Michael S. Huppert
Assistant Examiner—James Eller
Attorney, Agent, or Firm—Molly D. McKay

[57] ABSTRACT

A tie-down device which is removably securable without tools to an inside, downwardly oriented edge of the inner sidewalls of a pickup truck bed. The device has a stationary portion with an upwardly oriented front lip which inserts under the edge of the inner sidewall and has a loop connected to the front lip by means of a "U" shaped valley so that the loop extends upward on the inside of the truck bed. A movable portion which movably engages the loop can first be moved upward in order to position the device so that the downwardly oriented edge is inserted in a gap formed between the front lip and a wedge shaped bumper provided on the movable portion. The movable portion can then be moved downward to secure the device to the pickup truck by wedging the downwardly oriented edge between the bumper and between a vertical face of the front lip. The front lip is provided with a rubberized coating to prevent the device from scratching the finish of the truck bed.

12 Claims, 2 Drawing Sheets

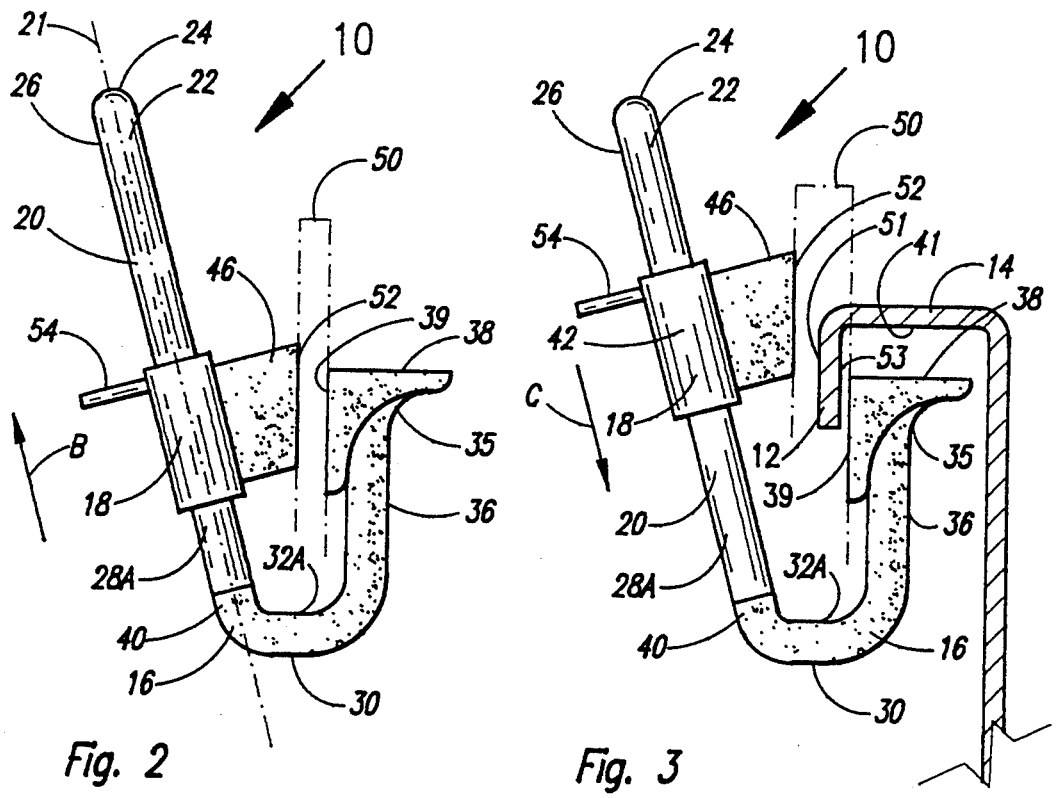
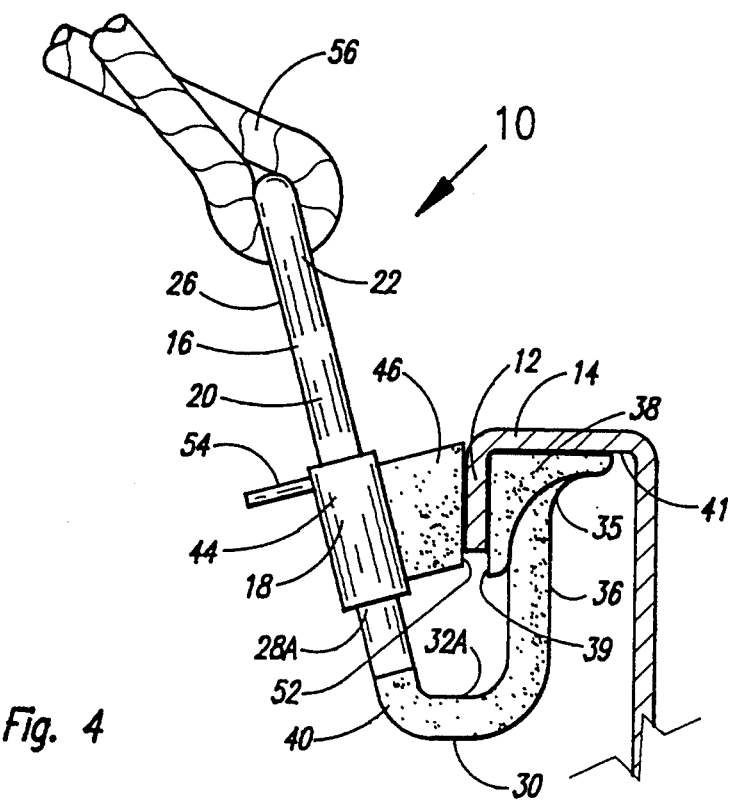

REMOVABLE TRUCK TIE-DOWN DEVICE

BACKGROUND OF THE INVENTION

1. Field of the Invention

The present invention relates to a device which can be removably secured without tools and without bolts, screws or other fastening means to an inner sidewall downwardly oriented edge of a pickup truck bed such that when secured thereto it serves as a means for attaching a rope or other similar device to the truck bed and when removed leaves no scratches or holes in the truck to indicate where the device was previously attached.

2. Description of the Related Art

Pickup trucks are popular vehicles because they are provided with a bed in which large objects may be placed for transport. It is often desirable to secure an object within the bed by means of ropes or other similar fastening devices in order that the object will not shift, bump, or possibly bounce out of the truck when being transported. Some pickup trucks beds are provided with stake holes located in the upper portion of the sidewalls which surround the bed on either side. Normally three such holes are provided in each sidewall with one of the stake holes located at the front end of the bed, another located at the back end of the bed, and the last one located approximately midway between the first two. These stake holes are generally the only structures provided in the bed through which a rope or similar device can be inserted in order to secure an object within the bed.

One drawback in using these stake holes to secure an object in the bed is that the stake holes are in fixed locations which are not always the optimum locations for tying an object within the bed, particularly when the object is of an odd shape or size. To address this problem, brackets may be permanently mounted to the top of the truck bed sidewalls via bolts, screws or other similar fastening means. Although these brackets can be secured at any location along the upper portion of the sidewalls, because of the way in which the brackets secure to the truck, removal of the brackets is time consuming, requires tools to accomplish, and leaves unsightly holes where the fastening means for the brackets have previously been.

The present invention addresses this problem with a tie-down device which can be secured to and removed from the inner sidewall downwardly oriented edge of a truck bed without the need for tools. The device can be positioned anywhere along the inner sidewall downwardly oriented edge of the truck bed and when removed from the truck bed, leaves no scratches or unsightly holes to indicate the device has been attached to the truck. Because of the manner in which the tie-down device secures to the truck bed, when in use, it is unlikely that the tie-down device will work loose or be dislodged from the truck bed.

SUMMARY OF THE INVENTION

A tie-down device removably securable without tools to an inner sidewall downwardly oriented edge of a pickup truck bed by wedging the downwardly oriented edge into a gap formed between a stationary portion and a movable portion of the device. The stationary portion consists of a front lip provided on a front side which inserts under the downwardly oriented edge and a rear side connected to the front side by means of a pair of "U" shaped bends or valleys formed in the stationary portion. The rear side is provided with an upwardly oriented inverted "V" shaped loop through which a rope may be inserted in order to secure an object within the truck bed. The movable portion is attached to and movable upward and downward along the rear side of the device. The movable portion is provided with a bumper which extends forward toward the front side. The bumper moves rearwardly when the movable portion is raised and moves forward to engage a rearwardly facing vertical face provided on the front lip when the movable portion is lowered. Alternately, when the device is positioned on an edge of a pickup truck bed, the bumper moves forward to wedge the edge between the bumper and the vertical face when the movable portion is lowered. A rearwardly extending tab is provided on the movable portion to facilitate grasping the movable portion in order to move it either upward or downward. The bumper is preferably constructed of a compressible non-abrasive material, and the front lip, including the vertical face, are preferably coated with a non-abrasive compressible material so that the device may be secured to and removed from the edge of the pickup truck bed without scratching or otherwise marring the finish of the pickup truck.

BRIEF DESCRIPTION OF THE DRAWINGS

FIG. 2 is a right side elevation of the device of FIG. 1 illustrating the movable portion being moved upward.

FIG. 3 is a right side elevation of the device being placed under a downwardly-oriented edge of a pickup truck bed illustrating the movable portion being moved downward to secure the device to the pickup truck bed.

FIG. 4 is a right side elevation of the device showing the device secured to the pickup truck bed.

DETAILED DESCRIPTION OF THE PREFERRED EMBODIMENTS

Figure 1:
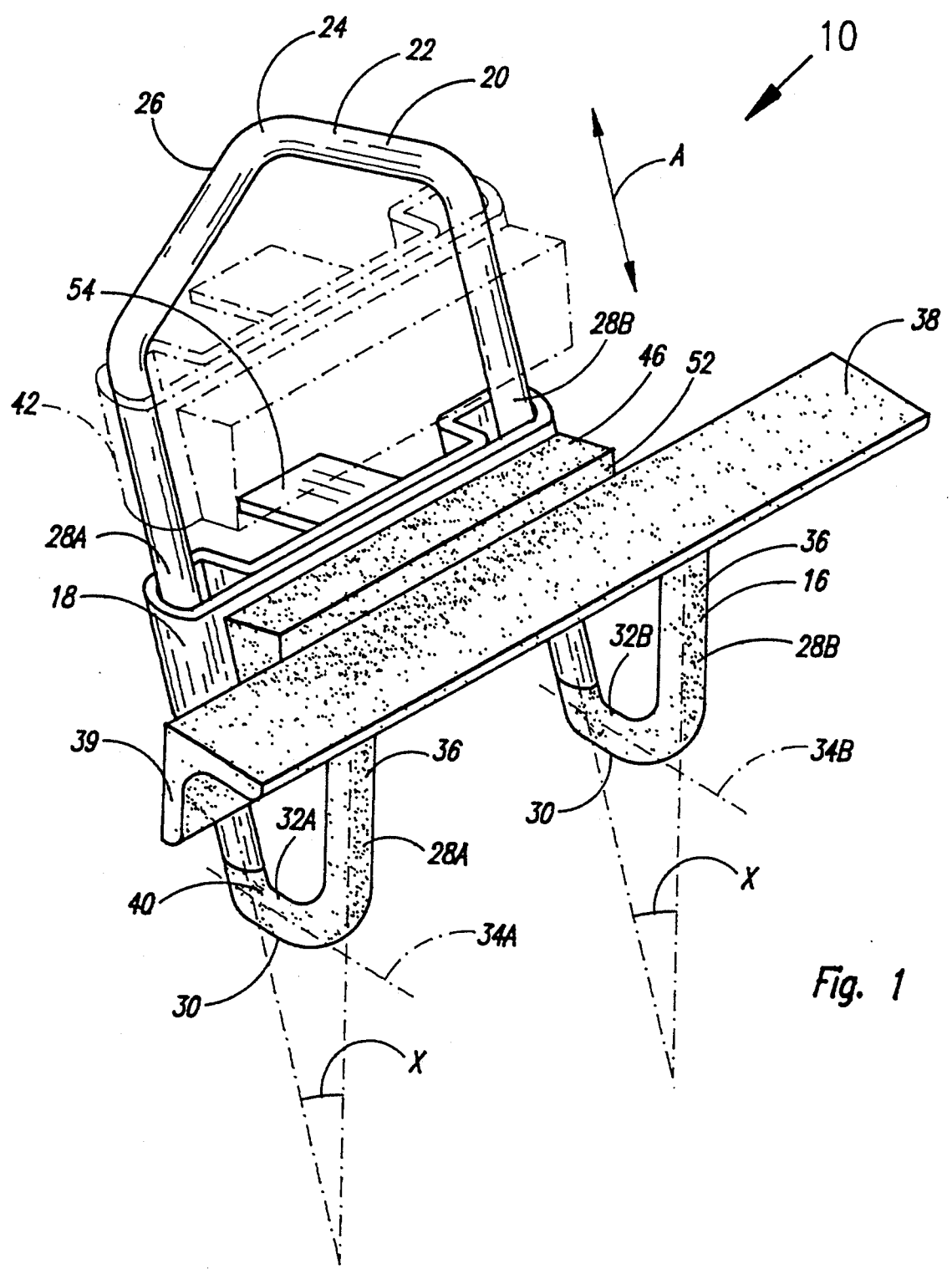
FIG. 1 is a perspective view of a removable truck tie-down device constructed according to a preferred embodiment of the present invention.

Referring now to the drawings, and initially to FIG. 1, there is illustrated a removal truck tie-down device 10 constructed according to a preferred embodiment of the present invention. The device 10 is illustrated attached to a downwardly oriented edge 12 of the pickup truck bed 14.

The device 10 consists of a stationary portion 16 and a movable portion 18. The movable portion 18 attaches to and is movable in a sliding manner relative to the stationary portion 16 as will be more fully explained hereafter.

As best illustrated in FIG. 1, the stationary portion 16 consists of a rod 20 which is bent in a first plane 21 to form a generally inverted "V" shaped loop 22 at an upper end 24 of a rear side 26 of the device 10 and two parallel legs 28 extending downward from the inverted "V" shaped loop 22 to a lower end 30 of the device 10. At the lower end 30 the two parallel legs 28A and 28B form identical "U" shaped bends 32A and 32B. In forming the "U" shaped bends 32A and 32B, the legs 28A and 28B are bent in a second pair of planes 34A and 34B respectively such that the second pair of planes 34A and 34B are generally parallel with each other and are approximately at right angles to the first plane 21.

On an upper end 35 of a front side 36 of the device 10, the legs 28A and 28B extend upward respectively from the U-shaped bends 32A and 32B and attach to a generally horizontal front lip 38. The front lip 38 and the rod 20 comprise the stationary portion 16. The front lip 38 is preferably provided with a vertical face 39 which faces toward the rear side 26. The front lip 38, its vertical face 39, the upward extending legs 28A and 28B attached to the front lip 38, and the "U" shaped bends 32A and 32B are preferably covered by a compressible, non-scratch coating 40, preferably a rubberized coating, in order that when the device 10 is secured to the pickup truck bed 14 and the lip 38 is engaged with an underside 41 of the pickup bed 14 located near the edge 12, the coating 40 will prevent the device 10 from scratching the edge 12 and the underside 41 of the pickup bed 14. Also, because the coating 40 is somewhat compressible, it helps to hold the device 10 snugly against the edge 12 as is illustrated in FIG. 4 and will be described more fully hereafter.

The movable portion 18 is movably attached to the two parallel legs 28A and 28B located at the rear side 26 of the device 10 such that the movable portion 18 moves upward and downward along the legs 28A and 28B between the inverted "V" shaped loop 22 and the "U" shaped bends 32A and 32B, movable between a fully raised position 42 as illustrated in FIG. 1 by the broken lines and also in FIG. 3 and a fully lowered position 44 as shown in FIG. 4. Movement between these fully raised and lowered positions 42 and 44 is illustrated by the arrows "A", "B" and "C" in FIGS. 1, 2 and 3.

The movable portion 18 is provided with a bumper 46 which extends outward towards the front side 36. The bumper 46 is wedge shaped in cross section as illustrated in FIGS. 2 through 4. The wedge shaped bumper 46 is initially separated from the vertical face 39 of the lip 38 by a gap 50 when the movable portion 18 is in its fully raised position 42. As the movable portion 18 is lowered toward its fully lowered position 44, the gap 50 decreases and the bumper 46 approaches the vertical face 39 as illustrated in FIG. 2. When the movable portion 18 reaches its fully lowered position 44, a forwardly oriented face 52 provided on the bumper 46 abuts the vertical face 39. Alternately, if the device 10 is positioned on a pickup truck bed 14, as illustrated in FIG. 4, the forwardly oriented face 52, abuts an inward face 51 of the downwardly oriented edge 12 and the vertical face 39 abuts an interior face 53 provided on the downwardly oriented edge 12 opposite the inward face 51, thereby securing the device 10 to the pickup truck bed 14. The legs 28A and 28B which extend rearwardly and forwardly from the "U" shaped bends 32A and 32B form identical acute angles X at the "Y" shaped bends 32A and 32B of between 15° and 20°, preferably approximately 18°. These acute angles X cause the gap 50 to be formed when the movable portion 18 is in its fully raised position 42 and causes the gap 50 to decrease in width as the movable portion 18 is moved to its fully lowered position 44. The bumper 46 is preferably constructed of a deformable or compressible material such as rubber so that when the device 10 is secured to the pickup bed 14 and the bumper 46 engages the lip 38, the bumper 46 will be compressed, thereby holding the device 10 securely against the edge 12. The bumper 46 is also non-abrasive and will prevent the device from scratching the edge 12.

A rearwardly extending tab 54 is provided on the movable portion 18 to facilitate grasping the movable portion 18 in order to make it easier to move the movable portion 18 between its fully raised and fully lowered positions 42 and 44.

In order to secure the device 10 to the truck bed 14, the movable portion 18 is first moved to its fully raised position 42. As illustrated in FIGS. 3 and 4, the device 10 then is placed under the downwardly oriented edge 12 of the pickup truck bed 14, moved upwardly so that the edge 12 inserts in the gap 50, and moved further upwardly as far as it can be extended so that the vertical face 39 of the lip 38 engages the interior face 53 of the edge 12. Finally, the movable portion 18 is moved downward toward its fully lowered position 44, thereby wedging the edge 12 between the vertical face 39 of the front lip 38 and the bumper 46 provided on the movable portion 18. The device 10 is now secured to the pickup truck bed 14, and a rope 56 or other similar fastening device (not illustrated) may be inserted through the "V" shaped loop 22 of the device 10 in order to secure an object (not illustrated) in the pickup truck bed 14.

In order to remove the device from the pickup truck bed 14, the tab 54 is grasped in order to move the movable portion 18 to its fully raised position 42, and the device 10 is lowered to remove it from the edge 12.

While the invention has been described for use on a truck bed, other uses are contemplated such as use on trailers, boats, and other vehicles or similar devices having a lip to which the invention can be attached.

While the invention has been described with a certain degree of particularity, it is manifest that many changes may be made in the details of construction and the arrangement of components without departing from the spirit and scope of this disclosure. It is understood that the invention is not limited to the embodiment set forth herein for the purposes of exemplification, but is to be limited only by the scope of the attached claim or claims, including the full range of equivalency to which each element thereof is entitled.

What is claimed is:

1. A device removably securable without the need for tools to a pickup truck bed for securing an object within the truck bed by means of a fastening device comprising:

a stationary portion having a front side engagable with a truck bed and an opposite rear side, said stationary portion being provided with two "U" shaped bends such that the "U" shaped bends are located between said front side of the stationary portion and said rear side of the stationary portion;

a front lip being provided on an upper end of said front side such that the front lip is removably engagable with an interior face of a downwardly oriented edge of a truck bed;

a movable portion being provided with a forward facing bumper, said movable portion being movably provided on said rear side of the stationary portion such that when the movable portion is moved upward relative to the stationary portion a gap formed between the bumper and the front lip increases in width; and an upper end of said rear side being provided with loop means located between said two "U" shaped bends; a fastening device for holding an object in the truck bed being secured to said loop means.

2. A device removably securable without the need for tools to a pickup truck bed according to claim 1 wherein the "U shaped bend" forms an angle of between 15 to 20 degrees between said front side and said rear side.

3. A device removably securable without the need for tools to a pickup truck bed according to claim 1 further comprising a tab provided on said movable portion and extending rearward therefrom for the purpose of grasping the movable portion in order to move it upward or downward relative to the stationary portion.

4. A device removably securable without the need for tools to a pickup truck bed according to claim 1 further comprising a compressible, non-scratch coating being provided covering said front lip.

5. A device removably securable without the need for tools to a pickup truck bed according to claim 1 wherein the bumper is wedge-shaped.

6. A device removably securable without the need for tools to a pickup truck bed according to claim 5 wherein the bumper is provided with a forward oriented face which is removably engagable with an inward face of the downwardly oriented edge.

7. A truck tie-down device removably securable without tools to a pickup truck bed for the purpose of securing an object within the pickup truck bed by means of a fastening device comprising:

a rod bent along a first plane to form an inverted "V" shaped loop at a rear side for receiving said fastening device and two parallel legs, said legs being bent along a set of parallel planes to form "U" shaped bends such that the parallel set of planes are perpendicular to the first plane, each said "U" shaped bend being located between a front side and the rear side, a front lip being provided on an upper end of the front side such that the front lip is removably engagable with an interior face of a downwardly oriented edge of a truck bed, and a movable portion being provided with a forward facing bumper, said movable portion movably provided along the rear side such that when the movable portion is moved upward a gap formed between the bumper and the front lip increases in width.

8. A tie-down device according to claim 7 wherein each "U" shaped bend forms an angle of between 15 and 20 degrees between said front side and said rear side.

9. A tie-down device according to claim 7 further comprising a tab provided on said movable portion for the purpose of grasping the movable portion in order to move it upward or downward.

10. A tie-down device according to claim 7 further comprising a compressible, non-scratch coating being provided covering said front lip.

11. A tie-down device according to claim 7 wherein the bumper is wedge-shaped.

12. A tie-down device according to claim 11 wherein the bumper is provided with a forward oriented face which is removably engagable with an inward face of said downwardly oriented edge of said truck bed.

* * * * *